US012314920B2

(12) United States Patent
Dunjic et al.

(10) Patent No.: US 12,314,920 B2
(45) Date of Patent: May 27, 2025

(54) TOKEN-BASED OPEN-LOOP STORED-VALUE CARD NETWORK

(71) Applicant: The Toronto-Dominion Bank, Toronto (CA)

(72) Inventors: Milos Dunjic, Oakville (CA); Zhihong Luo, Vaughan (CA)

(73) Assignee: The Toronto-Dominion Bank, Toronto (CA)

( * ) Notice: Subject to any disclaimer, the term of this patent is extended or adjusted under 35 U.S.C. 154(b) by 661 days.

(21) Appl. No.: 16/141,330

(22) Filed: Sep. 25, 2018

(65) Prior Publication Data
US 2020/0097937 A1   Mar. 26, 2020

(51) Int. Cl.
*G06Q 40/06* (2012.01)
*G06Q 20/06* (2012.01)
*G06Q 20/20* (2012.01)
*G06Q 20/34* (2012.01)
*G06Q 20/38* (2012.01)
*G06Q 20/40* (2012.01)
*H04L 9/32* (2006.01)
*H04L 29/06* (2006.01)

(52) U.S. Cl.
CPC ........ *G06Q 20/202* (2013.01); *G06Q 20/342* (2013.01); *G06Q 20/3821* (2013.01); *G06Q 20/40* (2013.01)

(58) Field of Classification Search
CPC ............... G06Q 20/202; G06Q 20/342; G06Q 20/3821; G06Q 20/40
See application file for complete search history.

(56) References Cited

U.S. PATENT DOCUMENTS

| 6,370,514 | B1 | 9/2002 | Messner | |
|---|---|---|---|---|
| 7,130,817 | B2 | 10/2006 | Karas | |
| 10,445,709 | B2 * | 10/2019 | McDonald | ........... G06Q 20/405 |
| 10,762,481 | B2 * | 9/2020 | Haldenby | .............. G06Q 20/20 |

(Continued)

FOREIGN PATENT DOCUMENTS

WO          2015056058 A1     4/2015

OTHER PUBLICATIONS

Dan Kosir, "Open vs. Closed Loop Mobile Payment", https://clearbridgemobile.com/open-vs-closed-loop-mobile-payments/, Google Search.

*Primary Examiner* — Talia F Crawley
(74) *Attorney, Agent, or Firm* — Graham Patent Law

(57) ABSTRACT

A token management server includes a memory and a data processor. The memory stores a token database and a subledger database. The processor is configured to save a token in the token database in a record in association with a ledger identifier and a subledger identifier. The processor receives from a point-of-sale station a token authorization request that includes the token and an authorization value, locates in the token database the record that includes the token, extracts the ledger identifier and the subledger identifier from the record, locates in the subledger database a subledger that is associated with the subledger identifier, and confirms that a balance value associated with the located subledger is at least equal to the authorization value. The processor then initiates a transfer from a pooling ledger that is associated with the ledger identifier of a transfer amount that is equal to the authorization value.

18 Claims, 10 Drawing Sheets

(56) References Cited

U.S. PATENT DOCUMENTS

| | | | |
|---|---|---|---|
| 11,961,142 B2* | 4/2024 | Leshner | G06Q 20/3829 |
| 2006/0213978 A1* | 9/2006 | Geller | G06Q 20/10 |
| | | | 235/380 |
| 2013/0339188 A1 | 12/2013 | Mohamed | |
| 2014/0236841 A1* | 8/2014 | Tan | G06Q 30/0279 |
| | | | 705/72 |
| 2015/0006305 A1* | 1/2015 | Randazza | G06Q 10/107 |
| | | | 705/17 |
| 2015/0206107 A1* | 7/2015 | Chen | G06Q 20/342 |
| | | | 705/39 |
| 2016/0371668 A1 | 12/2016 | Priebatsch | |
| 2017/0011460 A1* | 1/2017 | Molinari | H04L 9/3247 |
| 2017/0032365 A1* | 2/2017 | Liberty | G06Q 20/10 |
| 2017/0212781 A1* | 7/2017 | Dillenberger | G06F 9/5038 |
| 2017/0221049 A1* | 8/2017 | Jivraj | G06Q 20/322 |
| 2017/0221050 A1* | 8/2017 | Jivraj | G06Q 20/204 |
| 2017/0243193 A1* | 8/2017 | Manian | G06Q 20/3829 |
| 2017/0344981 A1* | 11/2017 | Jain | G06Q 20/10 |
| 2018/0018660 A1* | 1/2018 | Gomes | H04L 63/102 |
| 2018/0082284 A1* | 3/2018 | Gomes | G06Q 20/405 |
| 2018/0089645 A1* | 3/2018 | McDonald | G06Q 20/3825 |
| 2018/0276666 A1* | 9/2018 | Haldenby | H04L 9/3268 |
| 2019/0043043 A1* | 2/2019 | Saraniecki | G06F 16/1774 |
| 2019/0057368 A1* | 2/2019 | Jain | G06Q 20/209 |
| 2019/0139136 A1* | 5/2019 | Molinari | H04L 63/0823 |
| 2019/0180363 A1* | 6/2019 | Fabris | G16H 10/60 |
| 2019/0188654 A1* | 6/2019 | Albrecht | G06Q 10/06313 |
| 2019/0197521 A1* | 6/2019 | Rhee | G06Q 20/12 |
| 2020/0065802 A1* | 2/2020 | Mathieson | H04L 9/0637 |
| 2021/0065302 A1* | 3/2021 | Leshner | G06Q 20/3678 |

* cited by examiner

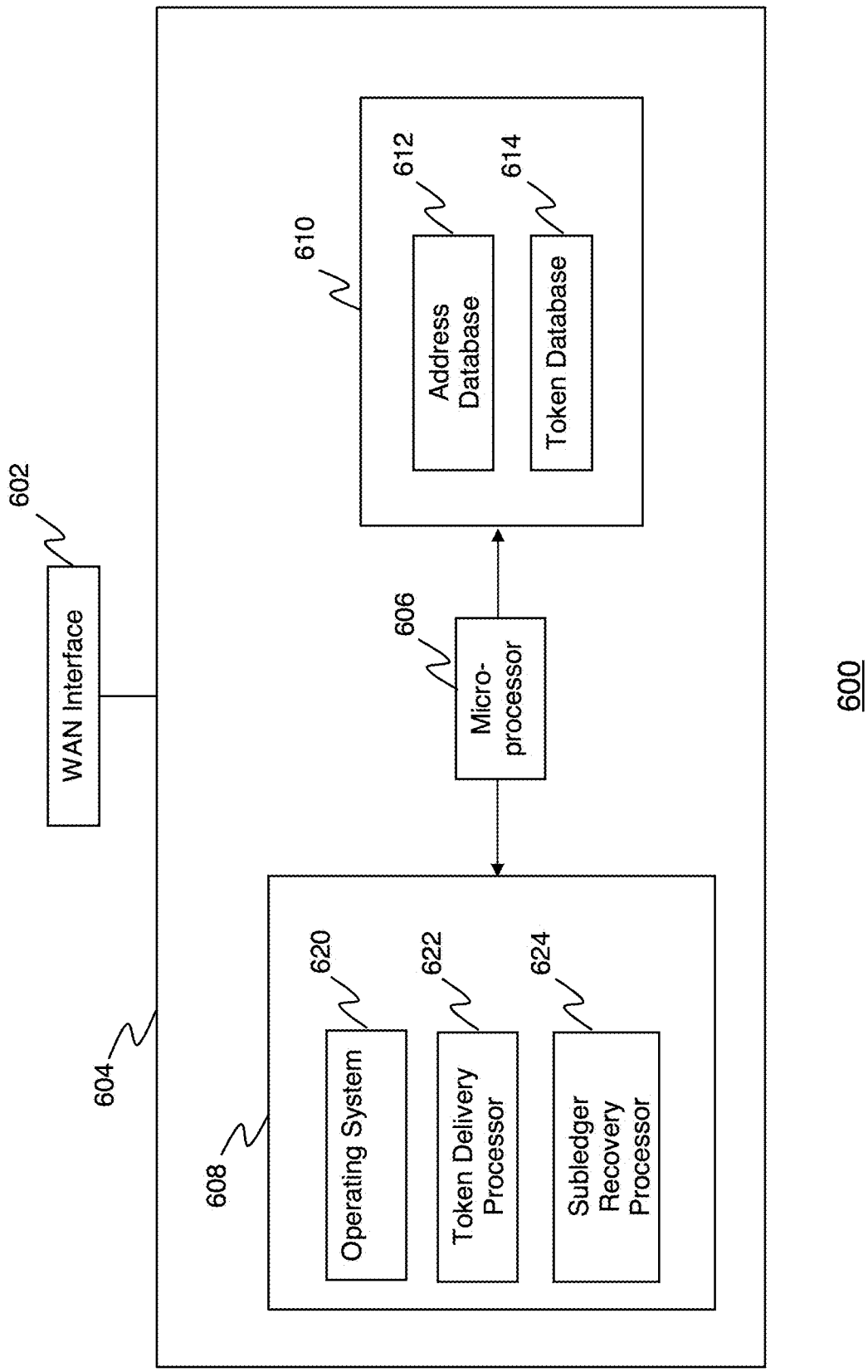

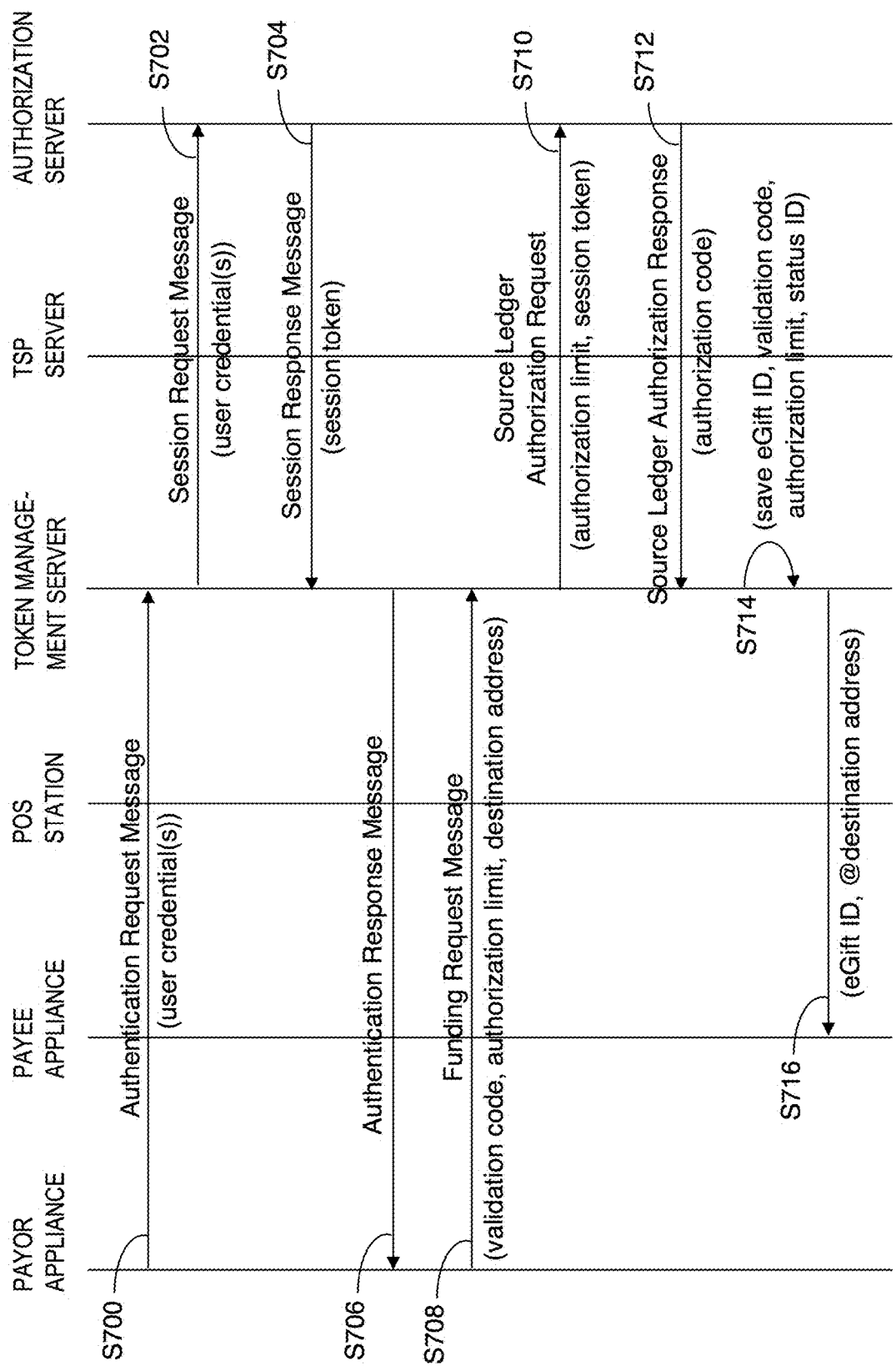

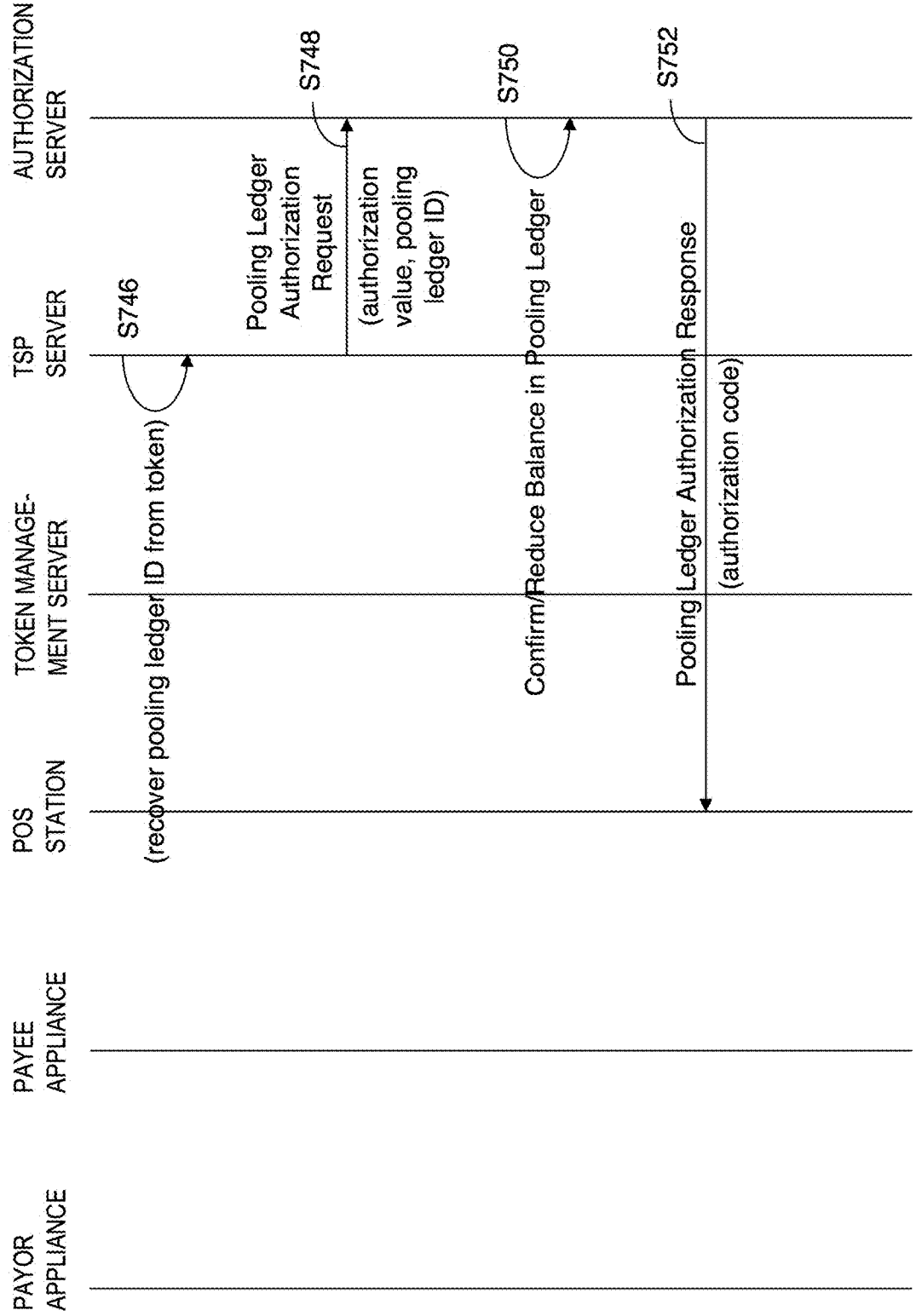

TOKEN-BASED OPEN-LOOP STORED-VALUE CARD NETWORK

FIELD

This patent application relates to a method and network for processing stored-value card data via a computer network.

BACKGROUND

Stored-value cards (also known as gift cards) allow consumers to make purchases anonymously at participating merchants. In contrast to a closed-loop stored-value card, particulars of the account associated with an open-loop stored-value card are not stored locally on the stored-value card but are instead stored in an online database.

When an open-loop stored-value card is presented to a merchant to effect payment for a transaction, the merchant's point-of-sale terminal reads card data from the stored-value card and transmits the card data and the desired redemption amount over a stored-value card network to a gift card issuer server. The gift card issuer server then determines from the online database whether the balance in the gift card account is sufficient to complete the transaction.

In order to maintain the security requirements of payment networks, the stored-value card network is maintained separate from the payment networks. Therefore, the merchant's point-of-sale terminal must be configured to access both the stored-value card network and the payment network.

SUMMARY

This patent application discloses a token management server, a token processing network, and an associated method in which a token is used to effect a transfer from a payment network ledger after confirming a balance in a stored-value card ledger.

In accordance with a first aspect of this disclosure, there is provided a token management server that includes a memory and a data processor. The memory may store a token database and a subledger database. The data processor is in communication with the memory.

The memory may also store computer processing instructions which, when executed by the data processor, cause the data processor to save in the token database a limited-use token in a token record, in association with a ledger identifier and a subledger identifier. The computer processing instructions also allow the data processor to receive from a point-of-sale station, via a payment network, a token authorization request that includes the limited-use token and an authorization value.

The computer processing may cause the data processor to locate in the token database the token record that includes the limited-use token, extract the subledger identifier from the located token record, locate in the subledger database a subledger that is associated with the subledger identifier, and confirm that a balance value that is associated with the located subledger is at least equal to the authorization value.

The computer processing may also cause the data processor to extract the ledger identifier from the located token record, and initiate a transfer from a pooling ledger that is associated with the ledger identifier of a transfer amount that is equal to the authorization value.

In accordance with a second aspect of this disclosure, there is provided a token processing network that includes a token service provider server, a token management server, a token database, and a subledger database.

The token service provider server may be configured to save, in the token database in a token record, a limited-use token in association with a ledger identifier and a subledger identifier.

The token management server may be configured to receive from a point-of-sale station, via a payment network, a token authorization request that includes the limited-use token and an authorization value, locate in the token database the token record that includes the limited-use token, extract the subledger identifier from the located token record, locate in the subledger database a subledger that is associated with the subledger identifier, and confirm that a balance value that is associated with the located subledger is at least equal to the authorization value.

The token management server may also be configured to extract the ledger identifier from the located token record, and initiate a transfer from a pooling ledger that is associated with the ledger identifier of a transfer amount that is equal to the authorization value.

In accordance with a third aspect of this disclosure, there is provided a method of processing limited-use tokens that involves a computer server saving a limited-use token in a token record in association with a ledger identifier and a subledger identifier. The computer server may also receive from a point-of-sale station, via a payment network, a token authorization request that includes the limited-use token and an authorization value.

The method may also involve the computer server locating the token record that includes the limited-use token, extracting the subledger identifier from the located token record, locating a subledger that is associated with the subledger identifier, and confirming that a balance value that is associated with the located subledger is at least equal to the authorization value.

The method may also involve the computer server extracting the ledger identifier from the located token record, and initiating a transfer from a pooling ledger that is associated with the ledger identifier of a transfer amount that is equal to the authorization value.

In one implementation, the token processing network or the token management server includes a funding database, and the token management server receives from one communications device, via one communications channel, a token request that includes a reference identifier and a credential, locates in the funding database a database record that is associated with the reference identifier, extracts a validation code from the located database record, and confirms that the credential matches the validation code. The token management server may then generate or retrieve the subledger identifier, save the subledger identifier in the token record, and save the subledger identifier in the located database record. In this implementation, the token service provider server may provide the one communications device with the limited-use token via another communications channel (i.e. that is different from the one communications channel).

Prior to receiving the token request, the token management server may receive from another communications device a funding request that includes the validation code and an authorization limit, initiate a transfer into the pooling ledger of a funding amount that is equal to the authorization limit, save the reference identifier in the located database record of the funding database in association with the validation code, and in the subledger database set/initialize the balance value of the located subledger equal to the authorization limit.

The token management server may receive a user identifier from the one communications device, and may initiate the transfer of the funding amount (into the pooling ledger) by obtaining authorization for a funds transfer of the funding amount from a source ledger that is associated with the user identifier.

Subsequently, the token management server may initiate the transfer of the transfer amount (from the pooling ledger) by obtaining authorization for a funds transfer of the transfer amount from the pooling ledger, and reducing the balance value of the located subledger by the authorization value.

The token processing network or the token management server may include an address database, the token request may include a device identifier, and the token service provider server may provide the one communications device with the limited-use token by locating in the address database a destination address that is associated with the device identifier, and transmitting the limited-use token to the destination address.

Since, in accordance with the foregoing aspects of the disclosure, the token processing network (or token management server) receives a limited-use token (from the communications device), but does not initiate the transfer of funds for the transaction from the stored-value account (subledger) that is linked to the limited-use token, possession of a limited-use token does not provide the recipient with access to the payment network account (pooling ledger) from which payment for the transaction is effected. Therefore, the security of the token processing network is enhanced in comparison to conventional stored-value card networks.

Further, since, prior to initiating the transfer from the pooling ledger, the token processing network (or token management server) confirms the balance value associated with the subledger, the institution server that maintains the pooling ledger is not tasked with responding to a request for a transfer unless the balance value associated with the subledger is already determined to be sufficient. Therefore, the load on the institution server, and the network traffic to and from that server, responding to transfer requests is less than conventional stored-value card networks.

Moreover, the point-of-sale station can transmit the limited-use token to the institution server over a payment network. Therefore, a merchant's point-of-sale station need not be specifically configured to access both a stored-value card network and a payment network.

BRIEF DESCRIPTION OF THE DRAWINGS

An exemplary token management server, a token processing network, and method of processing limited-use tokens will now be described, with reference to the accompanying drawings, in which:

FIG. 6 is a schematic view of an exemplary token service provider server; and FIGS. 7A, 7B, 7C and 7D together are a message flow diagram that depicts an exemplary method of processing limited-use tokens.

DETAILED DESCRIPTION

Token Processing Network—Overview

Figure 1:
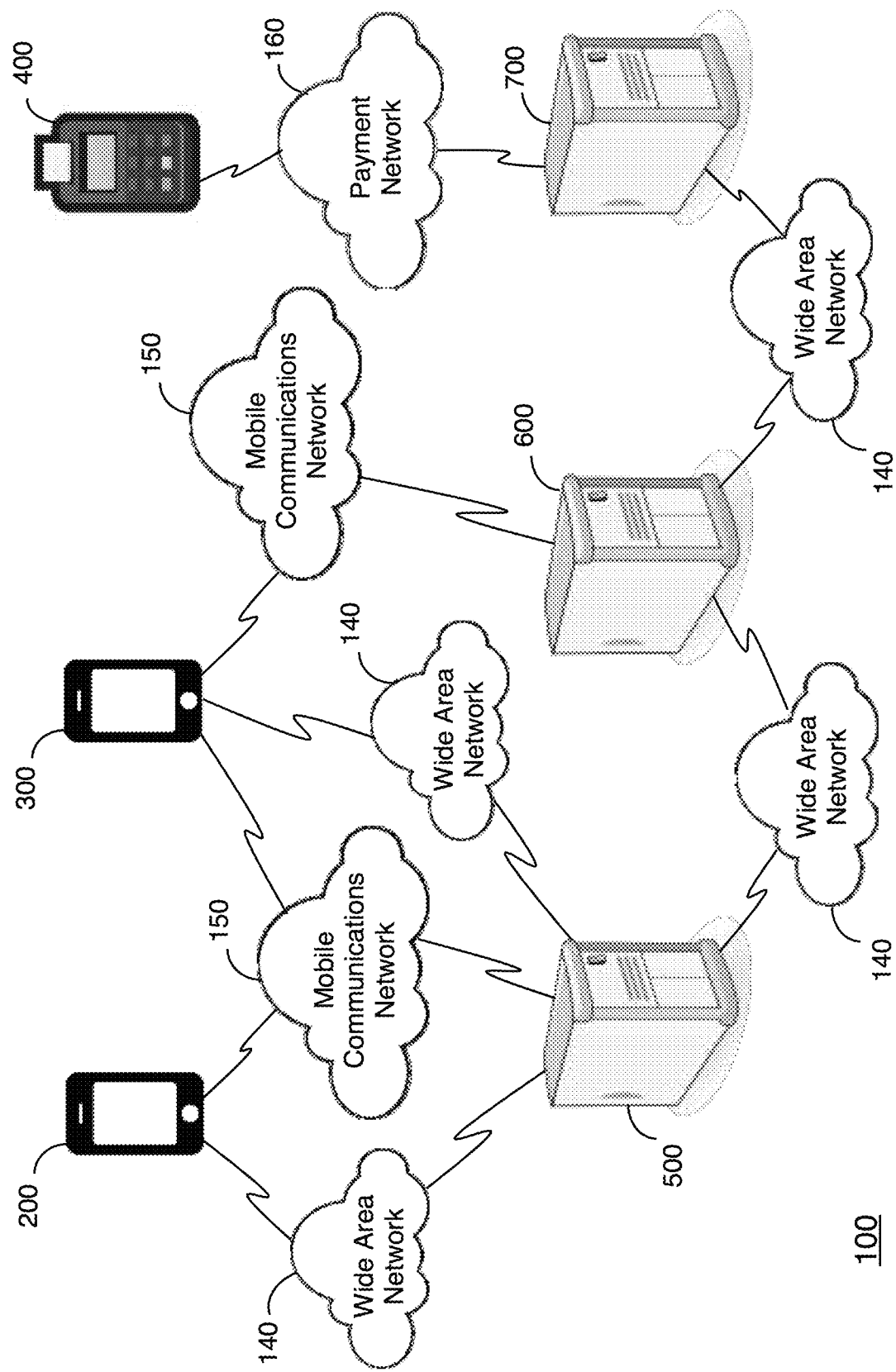
FIG. 1 is a schematic view of an exemplary token processing network, depicting a plurality of communications devices, a point-of-sale station, a token management server, a token service provider server, and an authorization server.

FIG. 1 is a schematic view of a token processing network, denoted generally as 100. As shown, the token processing network 100 includes a first communications device 200, a second communications device 300, a point-of-sale (POS) station 400, a token management server 500, a token service provider (TSP) server 600, and an authorization server 700.

The first communications device 200 may be configured to communicate with the token management server 500 via a wide area network 140, such as the Internet. Alternately, or additionally, the first communications device 200 may be configured to communicate with the token management server 500 via a mobile cellular communications network 150.

The second communications device 300 may be configured to communicate with the token management server 500 via the wide area network 140 and/or the mobile cellular communications network 150. The second communications device 300 is also configured to communicate with the TSP server 600 via the mobile cellular communications network 150.

The POS station 400 is configured to communicate with the authorization server 700 via a payment network 160 (e.g. VisaNet, Mastercard Network).

The token management server 500 is configured to communicate with the first communications device 200 and the second communications device 300 via the wide area network 140 and/or the mobile communications network 150. The token management server 500 is also configured to communicate with the TSP server 600 via the wide area network 140.

The TSP server 600 is configured to communicate with the token management server 500 and the authorization server 700 via the wide area network 140.

The authorization server 700 is configured to communicate with the POS station 400 via the payment network 160, and to communicate with the TSP server 600 via the wide area network 140.

The mobile communications network 150 may be configured as a LTE, WiMax, UMTS, CDMA or GSM network, as examples. The mobile communications network 150 typically includes a plurality of wireless base station subsystems (not shown). The communications devices 200, 300 may communicate with the base station subsystems via wireless links, and the base station subsystems may communicate with the token management server 500 and the TSP server 600 via wired, wireless or optical links. Therefore, the base station subsystems act as a bridge between the wireless links and the servers 500, 600.

As will be discussed in greater detail below, the token management server 500 (either independently, or in association with the TSP server 600) may receive a limited-use token (e.g. a string of alphabetic and/or numeric characters) and an authorization value, transform the limited-use token into a subledger identifier, and initiate the transfer (from a pooling ledger) of a transfer amount that is equal to the authorization value. However, prior to initiating the transfer from the pooling ledger, the token management server 500 may confirm that a balance in a subledger that is associated with the subledger identifier is at least equal to the authorization value.

For example, the token management server 500 may receive from the POS station 400 a token authorization request that includes a limited-use token and an authorization value. In response, the token management server 500 (either independently, or in association with the TSP server 600) may locate a pooling ledger identifier and a subledger identifier that are associated with the limited-use token, determine the balance value of a subledger associated with the subledger identifier, and confirm that the balance value is at least equal to the authorization value. If the balance value is confirmed, the token management server 500 may initiate a transfer, from a pooling ledger (associated with the pooling ledger identifier) of a transfer amount that is equal to the authorization value.

The token management server 500 may receive (e.g. from the second communications device 300) a token request that includes a reference identifier and a credential. In response, the token management server 500 may locate a validation code that is associated with the reference identifier, and confirm that the credential matches the validation code. The token management server 500 (either independently, or in association with the TSP server 600) may then generate the aforementioned subledger identifier, associate the subledger identifier and a pooling ledger identifier with a limited-use token, and provide the second communications device 300 with the limited-use token.

Further, prior to receiving the token request (e.g. from the second communications device 300), the token management server may receive (e.g. from the first communications device 200) a funding request that includes the validation code and an authorization limit. In response, the token management server 500 may initiate a transfer into the pooling ledger of a funding amount that is equal to the authorization limit, and associate the reference identifier with the validation code and the authorization limit.

Although the token processing network 100 is shown comprising only a single first communications device 200, a single second communications device 300, and a single POS station 400, the token processing network 100 typically includes a plurality of the communications devices 200, 300 and a plurality of the POS stations 400.

Conversely, although the token management server 500 and the TSP server 600 are depicted as distinct servers in FIG. 1, all or part of the functionality implemented by the TSP server 600 may instead be implemented by the token management server 500 (or vice versa). Moreover, in some situations, all or part of the functionality implemented by the token management server 500 and the TSP server 600 may instead be implemented by the authorization server 700.

First Communications Device

The first communications device 200 may be implemented as a wireless communications terminal, such as a portable digital assistant (PDA), a tablet computer or a smartphone. Alternately, the first communications device 200 may be implemented as a wired communications terminal, such as a personal computer or a web server.

Figure 2:
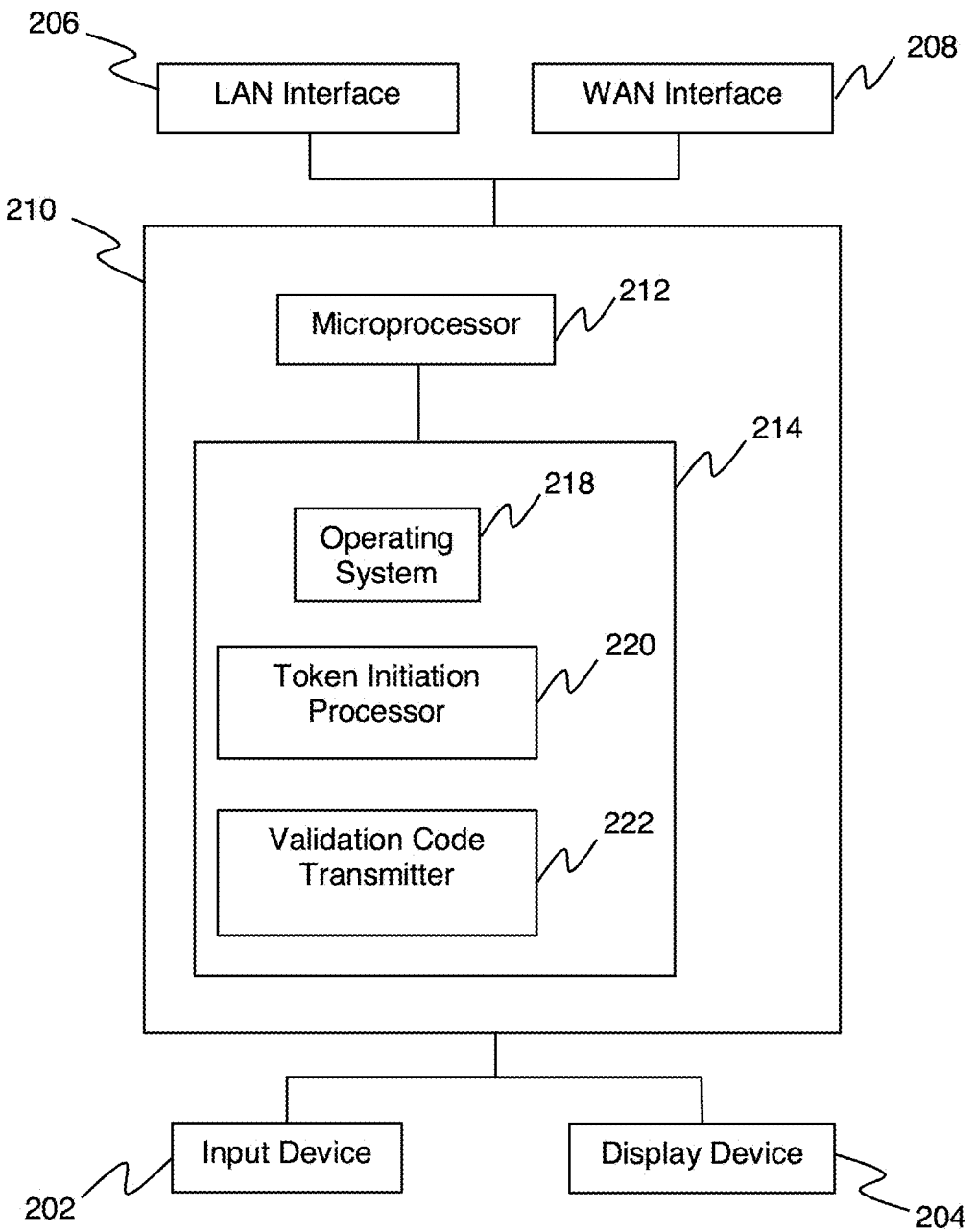
FIG. 2 is a schematic view of an exemplary first communications device.

As shown in FIG. 2, where the first communications device 200 is implemented as a wireless communications terminal or a personal computer, the first communications device 200 may include an input device 202, a display device 204 and a local area network (LAN) interface 206. Independently of the implementation of the first communications device 200, the first communications device 200 may also include a wide area network (WAN) interface 208, and a data processing system 210 that is in communication with the input device 202 (if present), the display device 204 (if present), the LAN interface 206 (if present) and the WAN interface 208.

The input device 202 (if present) may be implemented as a keyboard, touchpad, touchscreen or other input device suitable for allowing the operator to input data and/or commands into the first communications device 200. The display device 204 may be implemented as a liquid crystal display (LCD) panel, plasma display panel, or other display device suitable for displaying information to the operator of the first communications device 200.

The LAN interface 206 (if present) may interface the first communications device 200 with the second communications device 300. The LAN interface 206 may be configured as a wireless interface that allows the first communications device 200 to communicate directly with the second communications device 300 via a short-range wireless connection, such as a Bluetooth, or a Near Field Communications (NFC) connection, as examples. Alternately, the LAN interface 206 may be configured as a wired interface that allows the first communications device 200 to communicate directly with the second communications device 300 via a wired connection, such as a Universal Serial Bus (USB) connection, as an example.

The WAN interface 208 interfaces the first communications device 200 with the wide area network 140 and/or the mobile communications network 150, and allows the first communications device 200 to communicate with the token management server 500. Further, where the first communications device 200 is implemented as a web server, the WAN interface 208 may allow the second communications device 300 to communicate with the first communications device 200 via the wide area network 140.

The data processing system 210 includes a microprocessor 212 and a non-transient computer-readable medium 214. The non-transient computer-readable medium 214 may be provided as non-volatile electronic computer memory (e.g. FLASH memory), as an example. The non-transient computer-readable medium (memory) 214 may store a device identifier (e.g. an IMEI (International Mobile Equipment Identifier)) that is uniquely associated with the first communications device 200. The memory 214 may also store computer processing instructions which, when accessed from the memory 214 and executed by the microprocessor 212, implement at least an operating system 218, a token initiation processor 220 and a validation code transmitter 222.

The operating system 218 allows the first communications device 200 to accept user input from the input device 202 (if present) and to display information on the display device 204 (if present). The operating system 218 also allows the first communications device 200 to communicate with the token management server 500 (via the WAN interface 208). Further, where the first communications device 200 is implemented as a web server, the operating system 218 also allows the first communications device 200 to communicate with the second communications device 300.

The operator of the first communications device 200 may use the first communications device 200 to initiate delivery of a limited-use token to an identified recipient. The token initiation processor 220 may be configured to initiate the delivery of the token by, for example, transmitting to the token management server 500 a funding request message that includes a validation code and an authorization limit.

As will be discussed below, the funding request message may also include a destination address (e.g. telephone number, e-mail address) that is associated with the identified recipient, and the token management server 500 may respond to the funding request message, for example, by associating a unique reference identifier with the validation code and the authorization limit, and initiating a transfer (into a pooling ledger) of a funding amount equal to the authorization limit. The token management server 500 may then transmit the reference identifier to the identified recipient at the destination address.

As will be discussed, the pooling ledger and the subledger may each track monetary funds that are deposited into and/or withdrawn from an associated financial account (e.g. debit account, credit account), and the funding amount may be the quantum of a payment amount that is transferred into the pooling ledger. Alternately, the pooling ledger and the subledger may each track loyalty points that are deposited into and/or withdrawn from an associated loyalty points account, and the funding amount may be the quantum of loyalty points that are transferred into the pooling ledger.

The funding request message may also include a user identifier that is uniquely associated with the first communications device 200 (or the operator thereof). The token management server 500 may initiate the transfer (into the pooling ledger) of the funding amount, for example, by obtaining authorization (e.g. from the authorization server 700) for a funds/points transfer of the funding amount from a source ledger that is associated with the user identifier.

The operator of the first communications device 200 may also use the first communications device 200 to provide the identified recipient with the validation code. If the identified recipient is in possession of the second communications device 300, and the second communications device 300 is deployed in close proximity to the first communications device 200, the validation code transmitter 222 may be configured to provide the identified recipient with the validation code by, for example, generating a visual representation of the validation code (e.g. a two-dimensional bar code (QR code)) and displaying the visual representation on the display device 204 for capture by the second communications device 300.

Alternately, where the first communications device 200 includes the LAN interface 206 (e.g. the first communications device 200 is implemented as a wireless communications terminal or a personal computer), the validation code transmitter 222 may be configured to provide the second communications device 300 with the validation code by transmitting the validation code to the second communications device 300 via the LAN interface 206, over a short-range wireless connection or a wired connection established with the second communications device 300.

Where the first communications device 200 does not include the LAN interface 206 and/or is not deployed in close proximity to the second communications device 300 (e.g. the first communications device 200 is implemented as a web server), the validation code transmitter 222 may be configured to provide the second communications device 300 with the validation code by transmitting the validation code to the second communications device 300 via the WAN interface 208. In this variation, the first communications device 200 may receive a request from the second communications device 300 (via the WAN interface 208) for a limited-use token, and the validation code transmitter 222 may respond to the token request by transmitting the validation code to the second communications device 300 via the WAN interface 208.

Second Communications Device

The second communications device 300 may be implemented as a wireless communications terminal, such as a portable digital assistant (PDA), a tablet computer or a smartphone. Alternately, the second communications device 300 may be implemented as a wired communications terminal, such as a personal computer.

Figure 3:
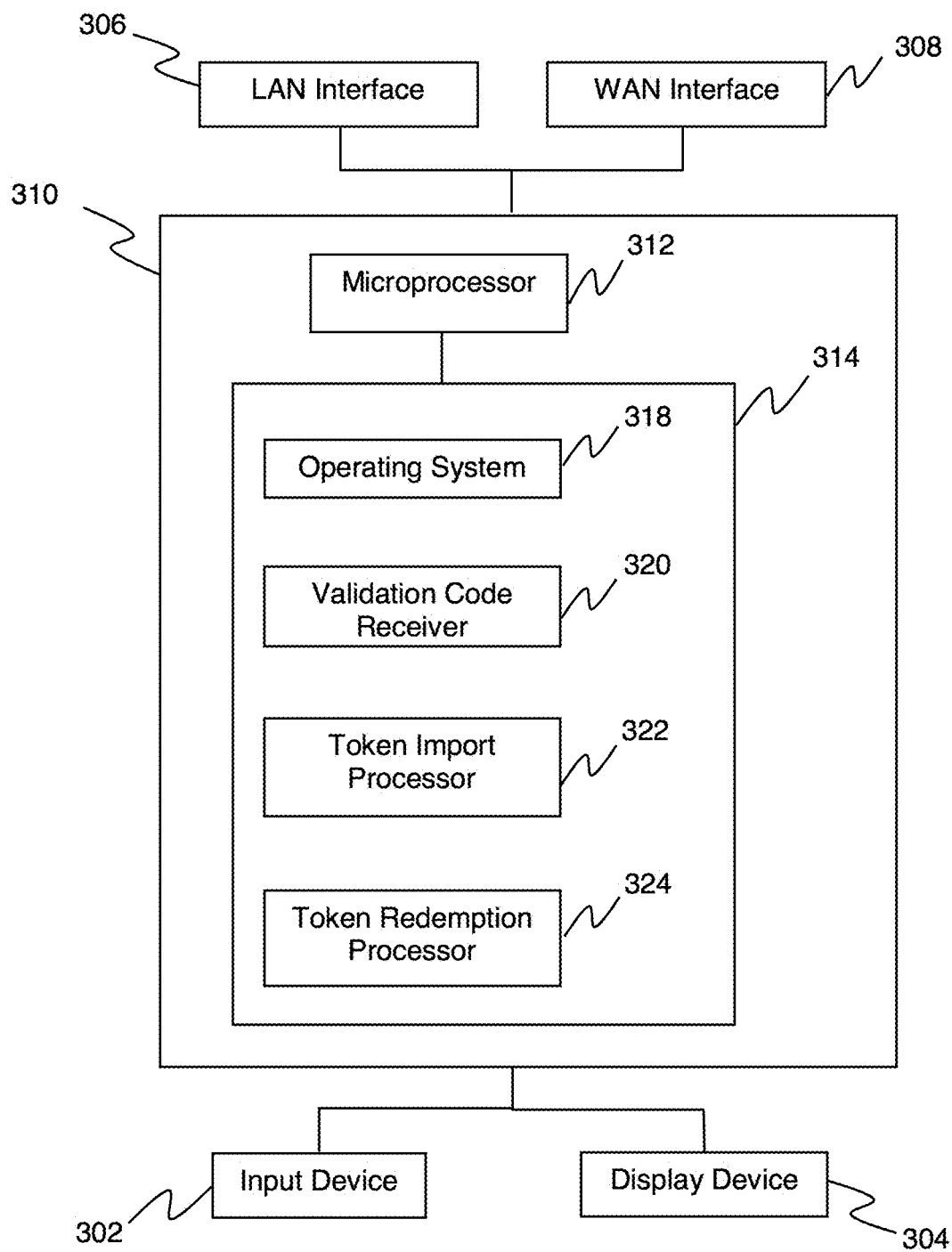
FIG. 3 is a schematic view of an exemplary second communications device.

As shown in FIG. 3, the second communications device 300 may include an input device 302, a display device 304, a wide area network (WAN) interface 308, and a data processing system 310 that is in communication with the input device 302, the display device 304 and the WAN interface 308. Where the first communications device 200 is implemented as a wireless communications terminal, the second communications device 300 may also include a local area network (LAN) interface 306 and an image capture device (e.g. CCD image sensor) 309 that is communication with the data processing system 310.

The input device 302 may be implemented as a keyboard, touchpad, touchscreen or other input device suitable for allowing the operator to input data and/or commands into the second communications device 300. The display device 304 may be implemented as a liquid crystal display (LCD) panel, plasma display panel, or other display device suitable for displaying information to the operator of the second communications device 300.

The LAN interface 306 (if present) may interface the second communications device 300 with the first communications device 200 and/or the POS station 400. The LAN interface 306 may be configured as a wireless interface that allows the second communications device 300 to communicate directly with the first communications device 200 and/or the POS station 400 via a short-range wireless connection, such as a Bluetooth, or a Near Field Communications (NFC) connection, as examples. Alternately, the LAN interface 306 may be configured as a wired interface that allows the second communications device 300 to communicate directly with the first communications device 200 and/or the POS station 400 via a wired connection, such as a Universal Serial Bus (USB) connection, as an example.

The WAN interface 308 interfaces the second communications device 300 with the wide area network 140 and/or the mobile communications network 150, and allows the second communications device 300 to communicate with the token management server 500 and/or the TSP server 600. Further, where the first communications device 200 is implemented as a web server, the WAN interface 308 may allow the second communications device 300 to communicate with the first communications device 200 via the wide area network 140.

The data processing system 310 includes a microprocessor 312 and a non-transient computer-readable medium 314. The non-transient computer-readable medium 314 may be provided as non-volatile electronic computer memory (e.g. FLASH memory), as an example. The non-transient computer-readable medium (memory) 314 may store a device identifier (e.g. an IMEI) that is uniquely associated with the second communications device 300. The memory 314 may also store computer processing instructions which, when accessed from the memory 314 and executed by the microprocessor 312, implement at least an operating system 318, a validation code receiver 320, a token import processor 322, and a token redemption processor 324.

The operating system 318 allows the second communications device 300 to accept user input from the input device 302 and to display information on the display device 304. The operating system 318 also allows the second communications device 300 to communicate with the first communications device 200 via the LAN interface 306 (if present), and to communicate with the first communications device 200 via the WAN interface 308 (where the first communications device 200 is implemented as a web server). Further, the operating system 318 allows the second communications device 300 to communicate with the token management server 500 and/or the TSP server 600 (via the WAN interface 308).

The operator of the second communications device 300 may use the second communications device 300 to receive a validation code from the first communications device 200. Where the first communications device 200 is configured to display a visual representation of the validation code on the display device 204, and the second communications device 300 is deployed in close proximity to the first communications device 200, the validation code receiver 320 may be configured to receive the validation code from the first communications device 200 by capturing the visual representation via the image capture device 309 (if present), and recovering the validation code from the captured image.

Alternately, where the second communications device 300 includes the LAN interface 306, the validation code receiver 320 may be configured to receive the validation code from the first communications device 200 via the LAN interface 206, over a short-range wireless connection or a wired connection established with the first communications device 200.

Where the second communications device 300 does not include the LAN interface 306 or is not deployed in close proximity to the first communications device 200 (e.g. the first communications device 200 is implemented as a web server), the validation code receiver 320 may be configured to receive the validation code from the first communications device 200 via the WAN interface 308.

The operator of the second communications device 300 may also use the second communications device 300 to import a limited-use token from the token processing network 100. The token import processor 322 may be configured to import the limited-use token by transmitting to the token management server 500 a token request that includes a credential and a reference identifier.

As discussed, the first communications device 200 may have transmitted to the token management server 500 a funding request message that included a validation code and a destination address. The destination address may be a network address (e.g. telephone number, e-mail address) that is associated with the second communications device 300 (or the operator thereof) and, therefore, the token management server 500 may have responded to the funding request message, for example, by associating a reference identifier with the validation code, and transmitting the reference identifier to the second communications device 300 using the specified destination address.

As will be discussed, the token management server 500 (independently of, or in association with, the TSP server 600) may respond to the token request, for example, by generating a subledger identifier, associating a limited-use token with the pooling ledger identifier and the subledger identifier, and providing the second communications device 300 with the limited-use token. The token request may also include a user identifier that is uniquely associated with an operator of the second communications device 300. Therefore, the token management server 500 may provide the second communications device 300 with the limited-use token by locating a device identifier that is associated with the user identifier, and transmitting the limited-use token to a communications device having the device identifier.

The second communications device 300 may receive the limited-use token, and the token import processor 322 save the limited-use token in the memory 314.

Further, prior to at least providing the second communications device 300 with the limited-use token, the token management server 500 may respond to the token request, for example, by locating the validation code that the token management server 500 had previously associated with the reference identifier, and confirming that the credential included in the token request matches the located validation code.

In this implementation, the second communications device 300 may provide the token management server 500 with the token request via the wide area network 140, and may receive the limited-use token from the TSP server 600 via the mobile communications network 150. Therefore, the token management server 500 (independently of, or in association with, the TSP server 600) may provide the second communications device 300 with the limited-use token over a communications channel that is distinct from the communications channel over which the token management server 500 receives the token request.

The operator of the second communications device 300 may also use the second communications device 300 to redeem a limited-use token with the token processing network 100. The token redemption processor 324 may be configured to redeem the limited-use token by reading a user input from the input device 302, authenticating the operator of the second communications device 300 from the user input, and transmitting the limited-use token to the POS station 400 after successfully authenticating the appliance operator.

As will be discussed, the POS station 400 may receive the limited-use token from the second communications device 300, and may respond by generating a token authorization request that includes the limited-use token and an authorization value, and transmitting the token authorization request to the authorization server 700.

As discussed, the token management server 500 may have received a funding request message, and may have responded to the funding request message, for example, by initiating a transfer (into a pooling ledger) of a funding amount equal to the authorization limit. The token management server 500 may also have received a token request message, and may have responded to the token request message, for example, by establishing a subledger, associating a subledger identifier with the subledger, associating a limited-use token with a polling ledger identifier and the subledger identifier, and setting/initializing a balance value of the subledger equal to the authorization limit. Therefore, the token management server 500 (independently of, or in association with, the TSP server 600) may respond to the token authorization request for example, by locating the pooling ledger identifier and the subledger identifier that the token management server 500 had previously associated with the limited-use token, determining a balance value of the subledger that is associated with the subledger identifier, and confirming that the balance value is at least equal to the authorization value. The token management server 500 may then identify the pooling ledger that is associated with the ledger identifier, and initiate a transfer (from the pooling ledger) of a transfer amount equal to the authorization value.

Further, as discussed, the pooling ledger and the subledger may each track monetary funds that are deposited into and/or withdrawn from an associated financial account (e.g.

debit account, credit account). Therefore, the transfer amount may be the quantum of a payment amount that is transferred from the pooling ledger. Alternately, the pooling ledger and the subledger may each track loyalty points that are deposited into and/or withdrawn from an associated loyalty points account. Therefore, the transfer amount may be the quantum of loyalty points that are transferred from the pooling ledger.

The token management server 500 may initiate the transfer (from the pooling ledger) of the transfer amount, for example, by obtaining authorization (e.g. from the authorization server 700) for a funds/points transfer of the transfer amount from the pooling ledger, and reducing the balance value of the subledger by the authorization value.

The second communications device 300 may receive an authorization response message (e.g. including the current balance value in the subledger) from the authorization server 700 in response to the token authorization request. The token redemption processor 324 may display the contents of the authorization response message on the display device 302.

Point-of-Sale (POS) Station

The point-of-sale (POS) station 400 may be implemented as an integrated point-of-sale (POS) terminal, or as a pin-pad device that communicates with an electronic cash register (ECR). Alternately, the point-of-sale (POS) station 400 may be implemented as a computer server, such as a merchant web server.

Figure 4:
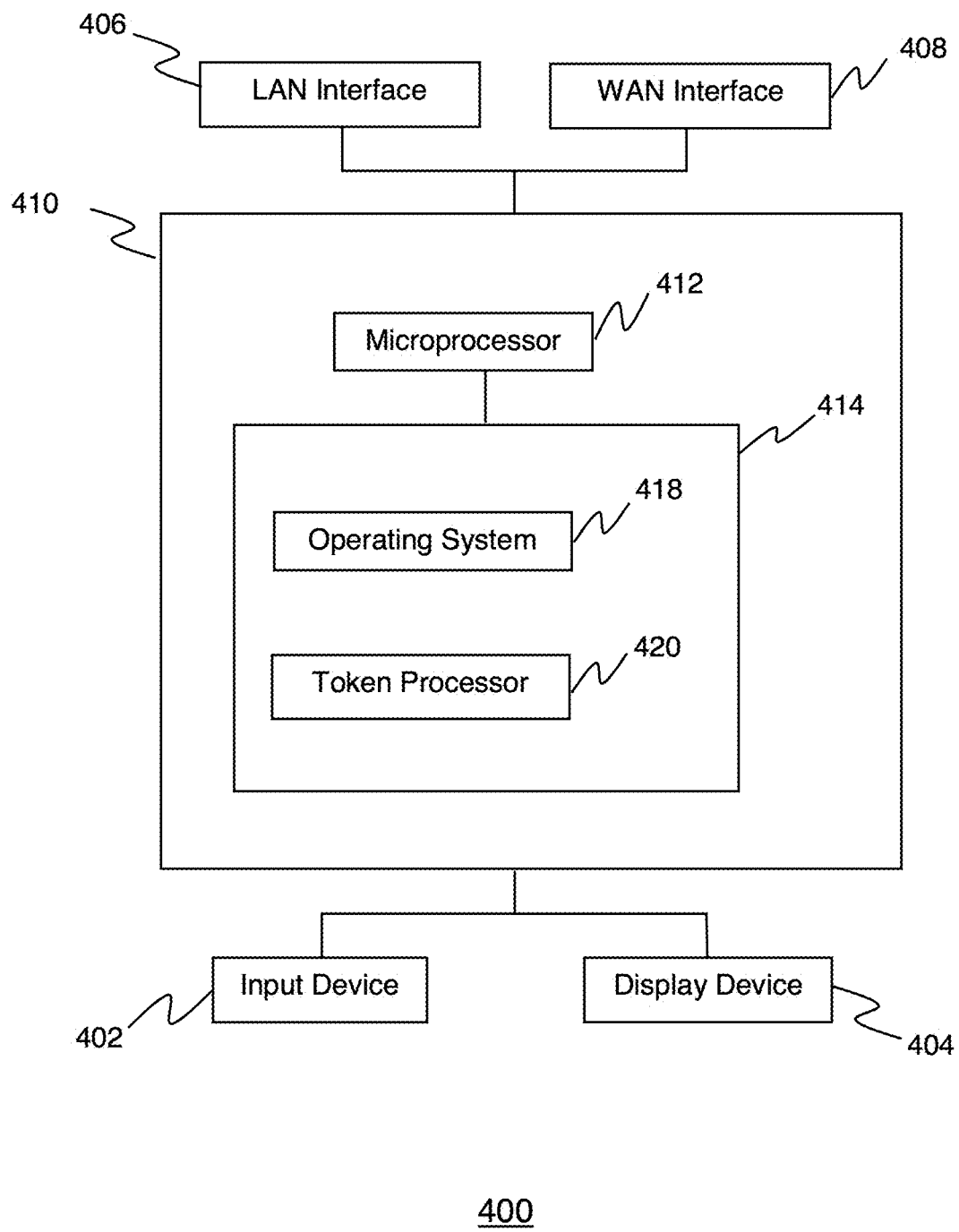
FIG. 4 is a schematic view of an exemplary point-of-sale station.

As shown in FIG. 4, the POS station 400 includes a WAN interface 408 and a data processing system 410 that is in communication with the WAN interface 408. If the POS station 400 is implemented as a POS terminal or as a pin-pad device, the POS station 400 may also include an input device 402, a display device 404, and a local area network (LAN) interface 406. In this latter implementation, the data processing system 410 is in communication with the input device 402, the display device 404, the LAN interface 406, and the WAN interface 408.

The input device 402 (if present) may be implemented as a keyboard, touchpad, touchscreen or other input device suitable for allowing the operator to input data and/or commands into the POS station 400. The display device 404 (if present) may be implemented as a liquid crystal display (LCD) panel, plasma display panel, or other display device suitable for displaying information to the operator of the POS station 400.

The LAN interface 406 may interface the POS station 400 with the second communications device 300. The LAN interface 406 may be configured as a wireless interface that allows the POS station 400 to communicate directly with the second communications device 300 via a short-range wireless connection, such as a Bluetooth, or a Near Field Communications (NFC) connection, as examples. Alternately, the LAN interface 406 may be configured as a wired interface that allows the POS station 400 to communicate directly with the second POS station 400 via a wired connection, such as a Universal Serial Bus (USB) connection, as an example.

The WAN interface 408 interfaces the POS station 400 with the payment network 160 and allows the POS station 400 to communicate with the financial institution server 700 via the payment network 160.

The data processing system 410 includes a microprocessor 412 and a non-transient computer-readable medium 414. The non-transient computer-readable medium 414 may be provided as non-volatile electronic computer memory (e.g. FLASH memory), as an example. The memory 414 may store computer processing instructions which, when accessed from the memory 414 and executed by the microprocessor 412, implement at least an operating system 418, and a token processor 420.

The operating system 418 allows the POS station 400 to accept user input from the input device 402 and to display information on the display device 404. The operating system 418 also allows the POS station 400 to communicate with the authorization server 700 (via the WAN interface 408).

The token processor 420 allows the POS station 400 to receive limited-use tokens from the second communications device 300, accept authorization values from the input device 402, generate token authorization requests from the limited-use tokens and the authorization values, and transmit the token authorization requests to the authorization server 700 via the payment network 160. The token processor 420 also allows the POS station 400 receive authorization responses from the authorization server 700, via the payment network 160, and to display the results thereof on the display device 404.

Token Management Server 500

Figure 5:
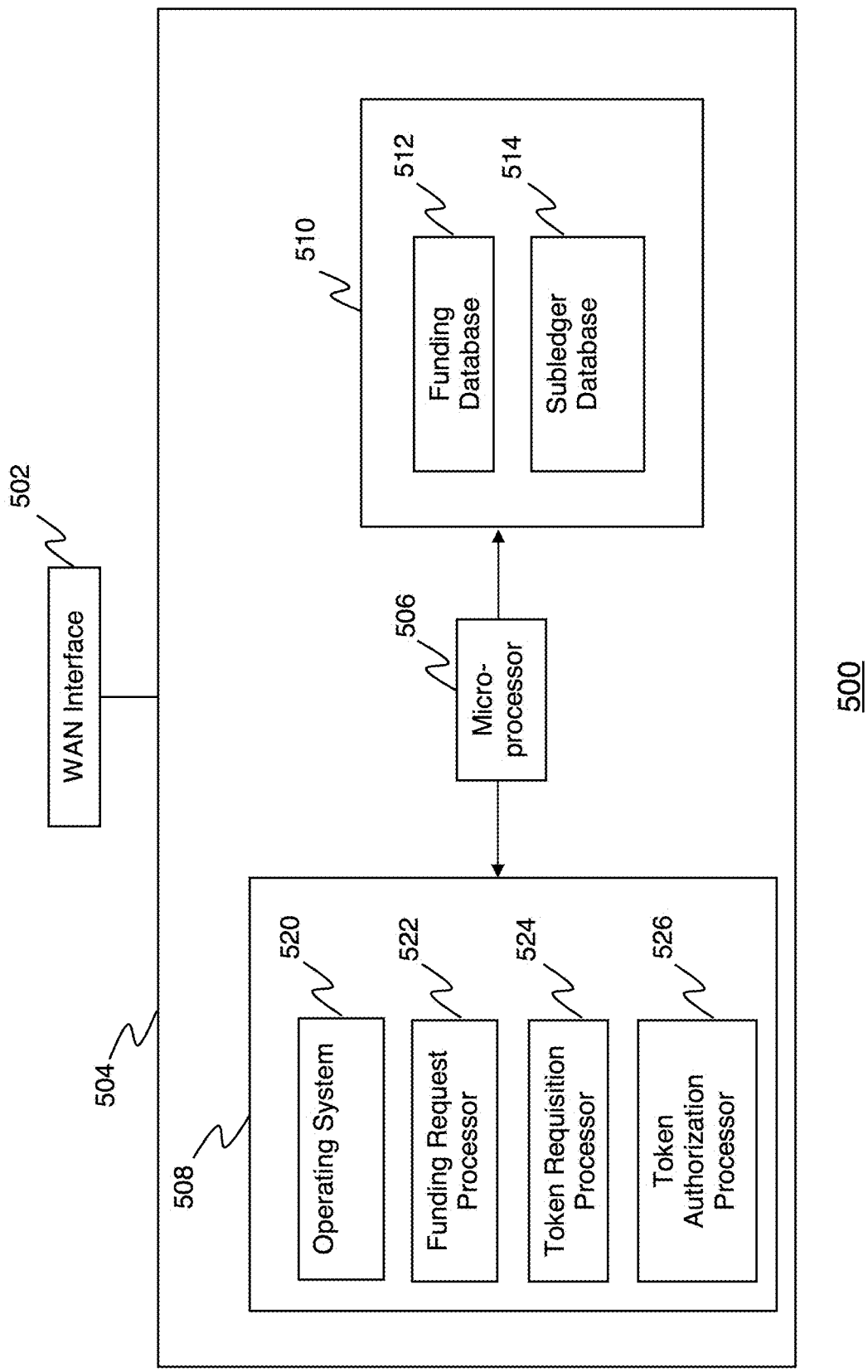
FIG. 5 is a schematic view of an exemplary token management server.

As shown in FIG. 5, the token management server 500 includes a wide area network (WAN) interface 502, and a data processing system 504 that is in communication with the WAN interface 502.

The WAN interface 502 interfaces the token management server 500 with the wide area network 140 and/or the mobile communications network 150, and allows the token management server 500 to communicate with the first communications device 200 and/or the second communications device 300 via the wide area network 140 and/or the mobile communications network 150. The WAN interface 502 also allows the token management server 500 to communicate with the POS station 400 and the authorization server 700 via the wide area network 140.

The data processing system 504 includes one or more microprocessors 506, a volatile computer-readable memory 508 and a non-transient computer-readable medium 510. The non-transient computer-readable medium 510 may be provided as one or more of a magnetic storage drive and a solid-state drive.

The computer-readable medium 510 may store a funding database 512 and a subledger database 514. Alternately, the funding database 512 and/or the subledger database 514 may be deployed on a database server (not shown) that is distinct from the token management server 500, and the token management server 500 may be configured to access the funding database 512 and/or the subledger database 514 via a secure communications channel.

The funding database 512 may store a plurality of database records each uniquely associated with a respective electronic gift (eGift) (e.g. monetary payment, loyalty points) and a respective (eGift) reference identifier. Each database record of the funding database 512 identifies one of the (eGift) reference identifiers, an associated validation code, and an authorization limit. Each (eGift) reference identifier is uniquely associated with the respective eGift.

The subledger database 514 may store a plurality of database records each uniquely associated with a respective subledger and a respective subledger identifier. Each database record of the subledger database 514 records deposit/withdrawal entries to the associated subledger, and identifies one of the subledger identifiers and a balance value of the net value of the deposit/withdrawal entries to the subledger. Each subledger identifier is uniquely associated with the respective subledger.

The computer-readable medium 510 also maintains computer processing instructions stored thereon which, when copied into the volatile computer-readable memory 508, and executed by the microprocessor(s) 506 from the volatile computer-readable memory 508, implement at least an operating system 520, a funding request processor 522, a token request processor 524 and a token authorization processor 526.

The operating system 520 allows the token management server 500 to at least communicate with the communications devices 200, 300, the TSP server 600 and the authorization server 700 (via the WAN interface 502).

The token management server 500 transforms funding requests (received from the first communications device 200) into pooling ledger transfers. The funding request processor 522 may be configured to transform the funding requests by, for example, (a) receiving from one of the communications devices (e.g. the first communications device 200) a funding request that includes a validation code and an authorization limit, and (b) initiating a transfer (into a pooling ledger) of a funding amount equal to the authorization limit.

The funding request processor 522 may also save a unique (eGift) reference identifier in the funding database 512 in association with the validation code and the authorization limit. The funding request processor 522 may ensure that each reference identifier is unique to the token processing network 100 by saving each new reference identifier in the funding database 512 only after confirming that the reference identifier has not previously been saved to the funding database 512.

The token management server 500 (independently of, or in association with, the TSP server 600) also transforms token requests (received from the second communications device 300) into limited-use tokens. The token request processor 524 may be configured to transform the token requests by, for example:
(a) receiving from one of the communications devices (e.g. the second communications device 300) a token request that includes a (eGift) reference identifier and a credential,
(b) locating in the funding database 512 the validation code that is associated with the (eGift) reference identifier, and confirming that the credential matches the validation code,
(c) establishing a subledger in the subledger database 514, associating a subledger identifier with the subledger in the subledger database 514, setting/initializing a balance value of the subledger equal to the authorization limit, and saving the balance value in the subledger, and
(d) providing the one communications device with the limited-use token.

The token request processor 524 may also generate a unique limited-use token and associate the limited-use token with the subledger identifier and a polling ledger identifier of the pooling ledger. The token request processor 524 may ensure that each limited-use token is unique to the token processing network 100 by generating the limited-use token using a noise generator or a suitable pseudo-random generator. The token request processor 524 may ensure that each subledger identifier is unique to the token processing network 100 by saving each new subledger identifier in the subledger database 514 only after confirming that the subledger identifier has not been previously saved to the subledger database 514.

Alternately, the limited-use token may be provided to the one communications device over a communications channel that is different from the communications channel over which the token request processor 524 received the token request. Therefore, as will be discussed, the token management server 500 may receive the token request from the second communications device 300 via the wide area network 140, and the token request processor 524 may establish a subledger, associate a unique subledger identifier with the subledger, and transmit to the TSP server 600 a token requisition that includes the subledger identifier and a pooling ledger identifier. The TSP server 600 may respond to the token requisition by generating the unique limited-use token, associating the unique limited-use token with the subledger identifier and the pooling ledger identifier, and transmitting the limited-use token to the second communications device 300 via the mobile communications network 150.

The token management server 500 (independently of, or in association with, the TSP server 600) also transforms token authorization requests (received from the POS station 400) into pooled account authorization requests. The token authorization processor 526 may be configured to transform the token authorization requests by, for example:
(a) receiving from the POS station 400 a token authorization request that includes a limited-use token and an authorization value,
(b) locating the subledger identifier that is associated with the limited-use token, and confirming that the balance value of the subledger associated with the subledger identifier in the subledger database 514 is at least equal to the authorization value, and
(c) locating the pooling ledger identifier that is associated with the limited-use token, and initiating a transfer from the pooling ledger (associated with the pooling ledger identifier) of a transfer amount equal to the authorization value.

Token Service Provider (TSP) Server

As shown in FIG. 6, the TSP server 600 includes a wide area network (WAN) interface 602, and a data processing system 604 that is in communication with the WAN interface 602.

The WAN interface 602 interfaces the TSP server 600 with the wide area network 140 and/or the mobile communications network 150, and allows the TSP server 600 to communicate with the token management server 500 and the authorization server 700 via the wide area network 140. The WAN interface 602 also allows the TSP server 600 to communicate with the second communications device 300 via the mobile communications network 150.

The data processing system 604 includes one or more microprocessors 606, a volatile computer-readable memory 608 and a non-transient computer-readable medium 610. The non-transient computer-readable medium 610 may be provided as one or more of a magnetic storage drive and a solid-state drive.

The computer-readable medium 610 may store an address database 612 and a token database 614. Alternately, the address database 612 and/or the token database 614 may be deployed on a database server (not shown) that is distinct from the TSP server 600, and the TSP server 600 may be configured to access the address database 612 and/or the token database 614 via a secure communications channel.

The address database 612 may store a plurality of database records each uniquely associated with a respective communications device 200, 300. Each database record of the address database 612 stores a device identifier (e.g. an IMEI) that is uniquely associated with the respective communications device 200, 300, and a user identifier that is uniquely associated with the operator of the respective communications device 200, 300.

The token database 614 may store a plurality of database records each uniquely associated with a respective limited-use token. Each database record of the token database 614 stores a limited-use token (e.g. a unique sequence of digits) in association with a (eGift) reference identifier and a pooling ledger identifier.

The computer-readable medium 610 also maintains computer processing instructions stored thereon which, when copied into the volatile computer-readable memory 608, and executed by the microprocessor(s) 606 from the volatile computer-readable memory 608, implement at least an operating system 620, a token delivery processor 622 and a subledger recovery processor 624.

The operating system 620 allows the TSP server 600 to at least communicate with the second communications device 300, the token management server 500 and the authorization server 700 (via the WAN interface 602).

The TSP server 600 may transform token requisitions (received from the token management server 500) into limited-use tokens. The token delivery processor 622 may be configured to transform the token requisitions by, for example:

(a) receiving (e.g. from the token management server 500) a token requisition that includes a pooling ledger identifier and a user identifier, (b) locating in the address database 612 the device identifier that is associated with the user identifier (e.g. the device identifier of the second communications device 300), (c) generating a unique limited-use token and a unique subledger identifier, and saving the limited-use token in the token database 614 in association with the subledger identifier and the pooling ledger identifier, and (d) transmitting the limited-use token to the communications device (e.g. the second communications device 300) associated with the device identifier.

The token delivery processor 622 may ensure that each limited-use token and subledger identifier is unique to the token processing network 100 by saving each new limited-use token and each new subledger identifier in the token database 614 only after confirming that the limited-use token and the subledger identifier has not previously saved to the token database 614.

The TSP server 600 may also transform token authorization requests (received from the POS station 400 via the financial institution server 700) into pooled account authorization requests. The subledger recovery processor 624 may be configured to transform the token authorization requests by, for example:

(a) receiving from the POS station 400 (via the authorization server 700) a token authorization request that includes a limited-use token and an authorization value, (b) locating in the token database 614 the pooling ledger identifier that is associated with the limited-use token, and (c) initiating a transfer from the pooling ledger (associated with the pooling ledger identifier) of a transfer amount equal to the authorization value.

Authorization Server

The authorization server 700 may be administered by a financial or other institution that maintains monetary payment and/or loyalty points accounts for its customers.

The authorization server 700 maintains (or is in communication with) a ledger database (not shown) and a user profile database (not shown).

The ledger database includes a plurality of database records each uniquely associated with a respective ledger. Each database record of the ledger database stores a unique ledger identifier and may track monetary funds or loyalty points that are deposited into and/or withdrawn from the associated ledger.

The user profile database includes a plurality of database records each uniquely associated with a respective customer of the financial institution. Each database record of the user profile database stores one or more user credentials (e.g. userID, password) assigned to the associated customer, in association with at least one of the ledger identifiers.

As discussed above, the token management server 500 transforms funding requests into pooling ledger transfers and subledger initializations. Therefore, the ledger database maintains at least a pooling ledger (associated with a pooling ledger identifier) and one or more subledgers (each associated with a respective subledger identifier). Further, the authorization server 700 is configured to receive source ledger authorization requests (each including a session token and an authorization limit) from the token management server 500, and to determine whether a current balance of funds/points in the associated subledger is at least equal to the authorization limit.

The token management server 500 (independently of, or in association with, the TSP server 600) also transforms token authorization requests into pooled ledger authorization requests. Therefore, the authorization server 700 is also configured to receive pooled ledger authorization requests (each including a pooling ledger identifier and an authorization amount) from the token management server 500 and/or the TSP server 600, and to determine whether a current balance of funds/points in the associated pooling ledger is at least equal to the authorization value.

Method of Processing Limited-Use Tokens

As discussed, the token processing network 100 implements a method of processing limited-use tokens. A sample embodiment of the token processing method will be discussed with reference to FIGS. 7A, 7B, 7C and 7D. In this embodiment, the token management server 500 (either independently of, or in association with, the TSP server 600) associates at least one limited-use token with a pooling ledger identifier and a respective subledger identifier, and subsequently receives from the POS station 400 a token authorization request that includes a limited-use token and an authorization value.

The token management server 500 (either independently of, or in association with, the TSP server 600) locates the pooling ledger identifier and the subledger identifier that are associated with the limited-use token, determines a balance value of the subledger that is associated with the subledger identifier, and confirms that the balance value is at least equal to the authorization value. The token management server 500 then initiates a transfer from a pooling ledger that is associated with the ledger identifier of a transfer amount that is equal to the authorization value.

Figure 7B:
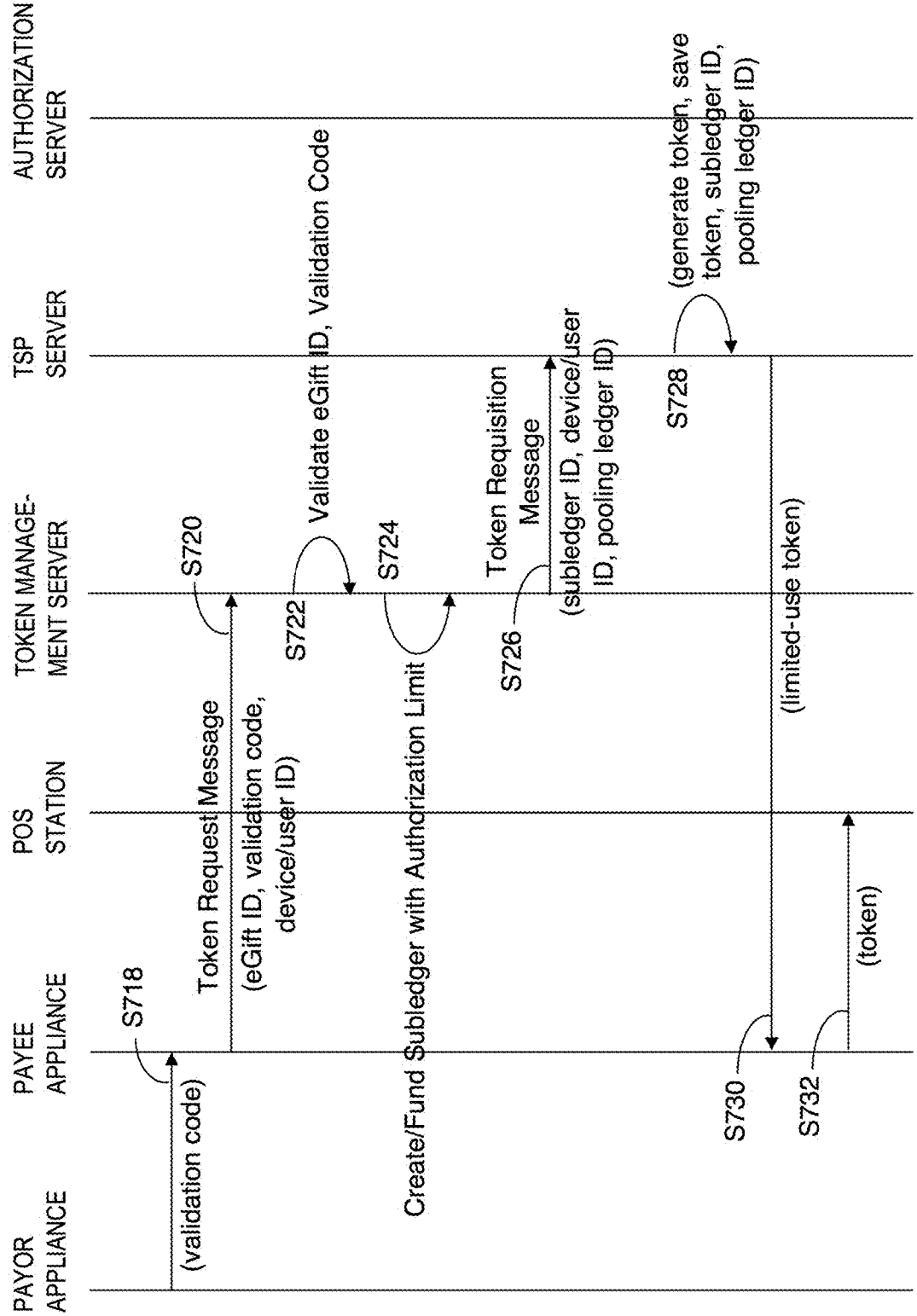
Figure 7C:
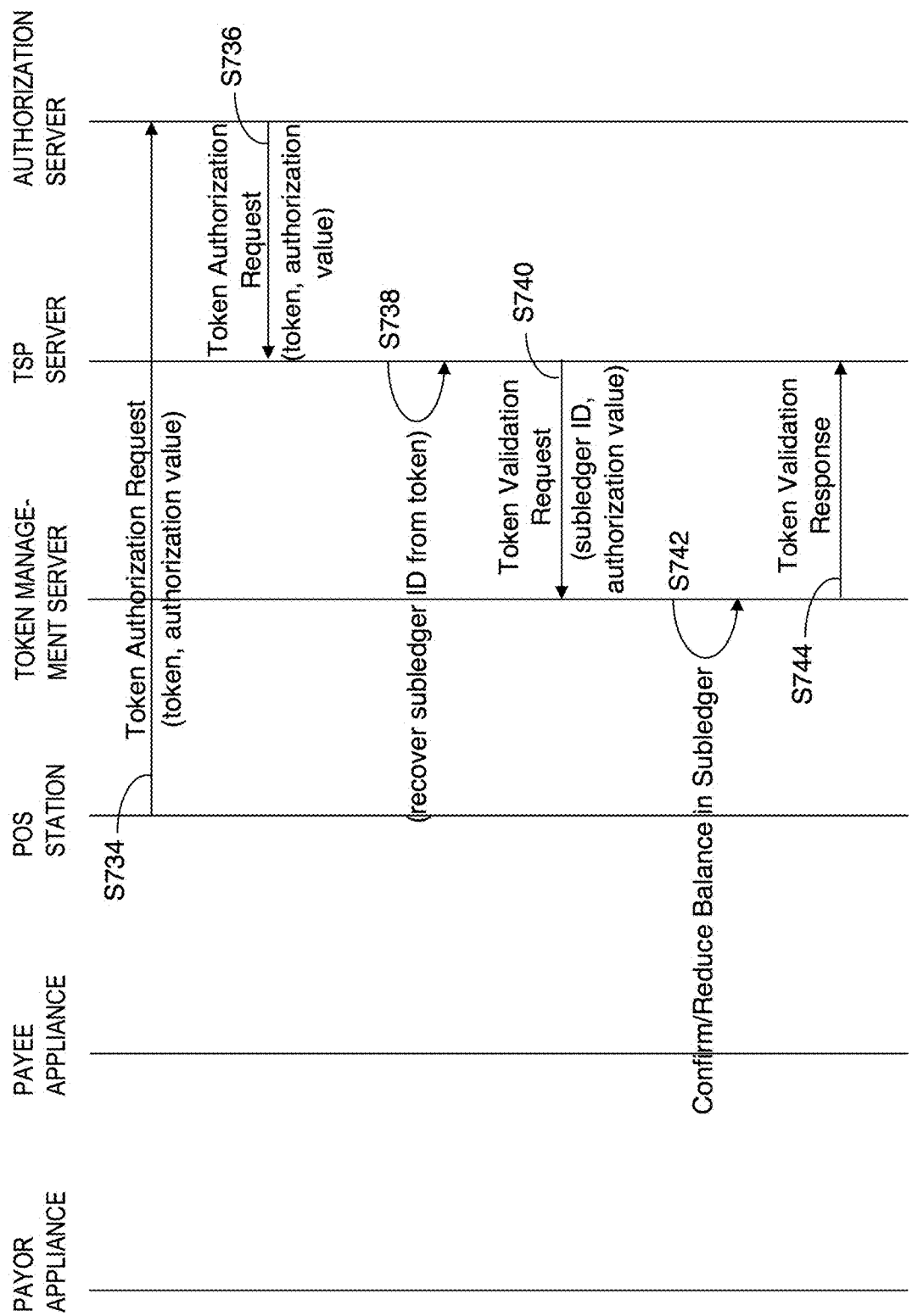

An example token processing method will now be discussed in detail with reference to FIGS. 7A, 7B, 7D and 7D. In the following example, the authorization server 700 maintains a ledger ("source ledger") that is uniquely associated with the operator of the first communications device 200. The source ledger includes a source ledger identifier, and tracks funds (monetary funds, loyalty points) that are deposited into and/or withdrawn from the source ledger.

Similarly, the authorization server 700 maintains at least one ledger ("pooling ledger") each uniquely associated with an entity that may administer the token management server 500. Each pooling ledger includes a pooling ledger identifier, and tracks funds (monetary funds, loyalty points) that are deposited into and/or withdrawn from the pooling ledger.

The operator of the first communications device 200 intends to transfer an electronic gift (e.g. monetary funds or loyalty points) to the operator of the second communications device 300. At least the operator of the first communications device 300 has one on more user credentials that authenticate the operator to the authorization server 700 and, therefore, the user profile database stores a copy of the user credential(s).

The operator of the second communications device 300 need not maintain an account with the financial institution or register with the token processing network 100. However, in one implementation discussed below, the operator of the second communications device 300 has a user identifier that identifies the operator to the TSP server 600, and the address database 612 stores the operator's user identifier in association with the device identifier of the second communications device 300.

(i) Initiate Delivery of Limited-Use Token

At the outset of the method, the operator of the first communications device 200 may authenticate to the token processing network 100 by entering into the first communications device 200, via the input device 202, one on more user credentials that authenticate the operator to the authorization server 700.

The communications device 200 may then establish an encrypted communications session (e.g. SSL, TLS) with the token management server 500, via the wide area network 140 or the mobile communications network 150. At step S700, the first communications device 200 generates an authentication request message that includes the user credential(s), and transmits the authentication request message to the token management server 500, via the encrypted communications session.

In response to the authentication request message, the token management server 500 generates a session request message that includes the user credential(s), and transmits the session request message to the authorization server 700, via the wide area network 140, at step S702.

In response to the session request message, the authorization server 700 authenticates the user credential(s) against the user profile database. If the operator of the first communications device 200 is successfully authenticated, (i.e. the user credential(s) correspond to one of the database records in the user profile database), the authorization server 700 locates the (source) ledger identifier that is associated with the user credential(s) in the user profile database, generates a unique session token, and associates the session token with the (source) ledger identifier. In this example, the (source) ledger identifier identifies a source ledger that is maintained by the financial institution on behalf of the operator of the first communications device 200.

The authorization server 700 then generates a session response message that includes the session token and indicates that the user credential(s) was/were successfully authenticated, and transmits the session response message to the token management server 500, via the wide area network 140, at step S704.

In response to the session response message, the token management server 500 associates the session token with the encrypted communications session, generates an authentication response message that indicates that the operator of the first communications device 200 was successfully authenticated, and transmits the authentication response message to the first communications device 200, via the encrypted communications session, at step S706.

After the first communications device 200 receives the authentication response message, the first communications device 200 may display the results of the authentication response message on the display device 204. The operator of the first communications device 200 then initiates delivery of a limited-use token to the operator of the second communication appliance 300 by entering an authorization limit value and a validation code into the first communications device 200, via the input device 202. The operator of the first communications device 200 may also enter, into the first communications device 200, a destination address (e.g. telephone number, e-mail address) that is associated with the operator of the second communication appliance 300.

At step S708, the token initiation processor 220 generates a funding request message that includes the validation code and the authorization limit (and the destination address, if input to the first communications device 200), and the first communications device 200 transmits the funding request message to the token management server 500, via the encrypted communications session.

In response to the funding request message, the funding request processor 522 of the token management server 500 generates a source ledger authorization request message that includes the authorization limit and the session token, and requests authorization for a funds transfer (monetary amount, loyalty points) in a funding amount equal to the authorization limit. The token management server 500 then transmits the source ledger authorization request message to the authorization server 700, via the wide area network 140, at step S710.

In response to the source ledger authorization request message, the authorization server 700 uses the session token to identify the source ledger that is associated with the operator of the first communications device 200 (previously determined at step S704), and then determines whether source ledger has sufficient funds (monetary amount, loyalty points) to complete the funds transfer (i.e. the balance of funds in the source ledger is at least equal to the funding amount).

If the authorization server 700 determines that the source ledger has sufficient funds to complete the funds transfer, the authorization server 700 reduces the available balance value associated with the source ledger by an amount equal to funding amount, and may generate authorization code from at least a private cryptographic key of the authorization server 700, the source ledger identifier and the funding amount. The authorization server 700 also generates a source ledger authorization response message that may include the authorization code and indicates that the funds transfer was authorized, and transmits the source ledger authorization response message to the token management server 500, via the wide area network 140, at step S712.

In response to the source ledger authorization response message, the funding request processor 522 generates a unique (eGift) reference identifier, and saves the (eGift) reference identifier in the funding database 512 in association with the validation code and the authorization limit, at step S714. The funding request processor 522 may also associate a status identifier with the (eGift) reference identifier, indicating that the associated electronic gift has not been claimed. The token management server 500 then provides the operator of the second communications device 300 with the (eGift) reference identifier at step S716, for example, by transmitting the (eGift) reference identifier to the destination address included in the funding request message.

After the token management server 500 receives one or more subledger authorization response messages, the token management server 500 may initiate completion of the funds transfer from the source ledgers by generating a clearing payload that includes one or more of the authorization codes, the associated funding amounts and the pooling ledger identifier of a pooling ledger maintained by the financial institution on behalf of the token management server 500. The token management server 500 may transmit the clearing payload to the authorization server 700 via the payment network 160, and the authorization server 700 may use its cryptographic key to confirm that the authorization server 700 generated the authorization codes, and may transfer the funding amounts from the source ledgers into the pooling ledger that is associated with the pooling ledger identifier.

(ii) Import Limited-Use Token

At step S718 (the timing of which is independent of whether the (eGift) reference identifier has already been provided to the operator of the second communications device 300 and whether the funding amount has already been transferred into the pooling ledger), the operator of the first communications device 200 provides the operator of the second communications device 300 with the validation code that is associated with the (eGift) reference identifier. The operator of the first communications device 200 may provide the validation code by any suitable means, including using the validation code transmitter 222 of the first communications device 200 to generate a visual representation of the validation code and displaying the visual representation on the display 202 for capture by the second communications device 300.

After the operator of the second communications device 300 receives both the (eGift) reference identifier and the associated validation code, the operator thereof may then request receipt of a limited-use token by invoking the token import processor 322, via the input device 302. The token import processor 322 may then generate a token request message that includes the (eGift) reference identifier and a credential (i.e. the associated validation code, and the unique device identifier of the second communications device 300.

Alternately, the token import processor 322 may prompt the operator of the second communications device 300 to input a user identifier into the second communications device 300. The operator may then enter the user identifier into the second communications device 300, via the input device 302, and the token import processor 322 may generate a token request message that includes the (eGift) reference identifier and a credential (i.e. the associated validation code), and the user identifier of the operator.

The communications device 300 may then establish an encrypted communications session (e.g. SSL, TLS) with the token management server 500, via the wide area network 140 or the mobile communications network 150. At step S720, the second communications device 300 transmits the token request message to the token management server 500, via the encrypted communications session.

In response to the token request message, the token request processor 524 of the token management server 500 locates in the funding database 512 the validation code that was saved therein in association with the (eGift) reference identifier (at step s714). At step S722, the token request processor 524 validates the token request message by confirming that the (eGift) reference identifier+credential included in the token request message matches the (eGift) reference identifier+validation code saved in the funding database 512.

If the token request processor 524 successfully validates the token request message, at step S724 the token request processor 524 generates a new unique subledger identifier, establishes a new subledger in the subledger database 514, and saves the subledger identifier in the subledger database 514 in association with the new subledger. The token request processor 524 also sets/initializes a balance value of the subledger equal to the authorization limit, and saves the balance value in the subledger. The token request processor 524 may also update the status identifier that is associated with the (eGift) reference identifier in the funding database 512, indicating that the associated electronic gift has now been claimed.

At step S726, the token request processor 524 generates a token requisition message that includes the subledger identifier, the device identifier of the second communications device 300 (or the user identifier of the operator thereof), and the pooling ledger identifier of one of the pooling ledgers that is maintained by the financial institution on behalf of the token management server 500. The token management server 500 then transmits the token requisition message to the TSP server 600, via the wide area network 140.

As will be discussed, after the TSP server 600 receives a limited-use token from the POS station 400, the token management server 500 initiates a transfer of a "transfer amount" of funds (monetary amounts, loyalty tokens) to a merchant, from the pooling ledger that is referenced in the token requisition message. Therefore, typically the pooling ledger referenced in the token requisition message is the same pooling ledger into which the funding amount was previously transferred (from the source ledger). However, the entity associated with the token management server 500 may elect to use, for the transfer of a transfer amount, a pooling ledger that is different from the pooling ledger that was used for the transfer of the funding amount.

In response to the token requisition message, at step S728 the token delivery processor 622 of the TSP server 600 generates a unique limited-use token, and saves the limited-use token in the token database 614 in association with the subledger identifier and the pooling ledger identifier. Preferably, the limited-use token is a unique sequence of digits that is prefixed with an Issuer Identification Number (IIN) that indicates that the limited-use token was generated by the TSP server 600 on behalf of the financial institution.

The token delivery processor 622 may then locate in the address database 612 the device identifier that is associated with the user identifier in the address database 612. At step S730, the TSP server 600 may then use the device identifier (and, for example, a push notification service) to transmit the limited-use token to the intended recipient (e.g. the second communications device 300), via the mobile communications network 150.

In this implementation, the TSP server 600 uses the device identifier stored in the address database 612 as the destination address for the limited-use token. Therefore, depending upon the device identifier that is associated with the user identifier in the address database 612, the TSP server 600 may transmit the limited-use token to a destination other than the second communications device 300. However, if the token requisition message already includes a device identifier, the token delivery processor 622 may not query the address database 612 for the device identifier, and (at step S730) the TSP server 600 may instead use the device identifier received from the second communications device 300 as the destination address for the limited-use token.

Upon receipt of the limited-use token, the token import processor 322 may save the limited-use token in the memory 314.

(iii) Redeem Limited-Use Token

After the second communications device 300 receives the limited-use token, the operator of the second communications device 300 may use the limited-use token to complete a transaction with a merchant.

As noted above, the POS station 400 may be implemented as a POS terminal or pin-pad device. In this situation, the operator may attend at the premises of the merchant and select a good or service that is available from the merchant. The merchant may then enter the required payment amount ("authorization amount") for the transaction into POS/pin-pad terminal 400 via the input device 402. In response, the token processor 420 of the POS/pin-pad terminal 400 may prompt the operator for a payment token.

The operator may then initiate completion of the transaction by interfacing the second communications device 300 with the POS/pin-pad terminal 400 via the LAN interface 306, and invoking the token redemption processor 324 on the second communications device 300 via the input device 302. In response, the token redemption processor 324 may transmit the limited-use token to the POS/pin-pad terminal 400 via the LAN interface 306, at step S732.

Alternately, the POS station 400 may be implemented as a merchant web server. In this situation, the second communications device 300 may initiate a communications session with the web server 400 via the WAN interface 308, and the operator may use the second communications device 300 to select a good or service that is available from the web server 400. The token processor 420 may then read the required payment amount ("authorization amount") for the transaction (e.g. from a merchant database, not shown), and may prompt the operator for a payment token.

The operator may then initiate completion of the transaction by invoking the token redemption processor 324. In response, the token redemption processor 324 may transmit the limited-use token to the web server 400 via the WAN interface 308, at step S732.

After the POS station (POS/pin-pad terminal, web server) 400 receives the limited-use token, the token processor 420 generates a token authorization request message that includes the limited-use token and the authorization value, and transmits the token authorization request message over the payment network 160, at step S734. Since the limited-use token is prefixed with the IIN of the financial institution, the payment network 160 directs the token authorization request message to the authorization server 700.

After the authorization server 700 receives the token authorization request message, the authorization server 700 determines from the IIN of the limited-use token that the TSP server 600 generated the limited-use token on behalf of the financial institution. Therefore, at step S736, the authorization server 700 redirects the token authorization request message to the TSP server 600.

After the TSP server 600 receives the token authorization request message, the subledger recovery processor 624 of the TSP server 600 initiates transforming the token authorization request message into a pooled account authorization request message by locating in the token database 614 the subledger identifier that is associated with the limited-use token in the token database 614 (step S738), generating a token validation request message that includes the subledger identifier and the authorization value, and transmitting the validation request message to the token management server 500 via the wide area network 140 (step S740).

After the token management server 500 receives the token validation request message, the token authorization processor 526 of the token management server 500 validates the limited-use token by locating the subledger that is associated with the subledger identifier in the subledger database 514, and confirming that the balance value of the subledger is at least equal to the authorization value, at step S742. The token authorization processor 526 then reduces the balance value by an amount equal to the authorization value.

The token authorization processor 526 then generates a token validation response message that confirms that the limited-use token was valid (i.e. the balance value of the subledger was at least equal to the authorization value). The token management server 600 transmits the token validation response message to the TSP server 600, via the wide area network 140 (in response to the token validation request message), at step S744.

After the TSP server 600 receives the token validation response message, the subledger recovery processor 624 of the TSP server 600 completes transforming the token authorization request message (into a pooled account authorization request message) by locating in the token database 614 the pooling identifier that is associated with the limited-use token in the token database 614 (step S746), and generating a pooling account authorization request message that includes the pooling ledger identifier and the authorization value and requests authorization for a funds transfer (monetary amount, loyalty points) in a transfer amount equal to the authorization amount. At step S748, the TSP server 600 initiates a transfer of the transfer amount from the pooling ledger by transmitting the pooling account authorization request message to the authorization server 700, via the wide area network 140, in response to the token authorization request message.

In response to the pooling account authorization request message, the authorization server 700 uses the pooling account identifier to identify the pooling ledger that is associated with the pooling account identifier, and then determines whether pooling ledger has sufficient funds (monetary amount, loyalty points) to complete the funds transfer (i.e. the balance of funds in the pooling ledger is at least equal to the transfer amount), at step S750. If the authorization server 700 determines that the pooling ledger has sufficient funds to complete the funds transfer, the authorization server 700 reduces the available balance value associated with the pooling ledger by an amount equal to the transfer amount.

The authorization server 700 may also generate an authorization code from at least a private cryptographic key of the authorization server 700, the pooling ledger identifier and the transfer amount. The authorization server 700 then generates a pooling ledger authorization response message that may include the authorization code and indicates that the funds transfer (from the subledger) was authorized, and transmits the pooling ledger authorization response message to the POS station 400, via the payment network 160, at step S752, in response to the token authorization request message.

However, if the subledger recovery processor 624 is unable to locate the limited-use token in the token database 614 (step S738), or the authorization processor 526 is unable to confirm that the balance value of the subledger is at least equal to the authorization value (at step S742), the subledger recovery processor 624 of the TSP server 600 generates a token authorization response message that indicates that the limited-use token was invalid or the subledger balance was insufficient to complete the transaction. The TSP server 600 then transmits the token authorization response message to the authorization server 700, via the wide area network 140, in response to the token authorization request message.

In response, the authorization server 700 generates a pooling ledger authorization response message that indicates that the funds transfer was not authorized, and transmits the pooling ledger authorization response message to the POS station 400, via the payment network 160, at step S752.

Independently of whether the pooling ledger authorization response message indicates that the funds transfer was authorized, the POS station 400 may display the pooling ledger authorization response message on the display device 404 (where the POS station 400 is implemented as a POS terminal or a pin-pad device).

After the POS station 400 receives one or more pooling ledger authorization response messages, the POS station 400 may initiation completion of the authorized funds transfers (from the pooling ledger) by generating a clearing payload that includes one or more of the authorization codes, the associated transfer amounts and the merchant ledger identifier of a merchant ledger maintained by the financial institution on behalf of the merchant. The POS station 400 may transmit the clearing payload to the authorization server 700 via the payment network 160, and the authorization server 700 may use its cryptographic key to confirm that the authorization server 700 generated the authorization codes, and may transfer the transfer amounts from the pooling ledger into the merchant ledger that is associated with the merchant ledger identifier.

The invention claimed is:

1. A token management server comprising:
a memory storing a token database, a subledger database and a plurality of computer processing instructions; and
a data processor in communication with the memory, wherein the computer processing instructions cause the data processor to:
save in the token database a limited-use token in a token record in association with a ledger identifier and a subledger identifier;
receive from a point-of-sale station, via a payment network, a token authorization request including the limited-use token and an authorization value;
locate in the token database the token record including the limited-use token, extract the subledger identifier from the located token record, locate in the subledger database a subledger associated with the subledger identifier, and confirm that a balance value associated with the located subledger is at least equal to the authorization value; and
extract the ledger identifier from the located token record, and initiate a transfer from a pooling ledger associated with the ledger identifier of a transfer amount equal to the authorization value.

2. The token management server according to claim 1, wherein the memory further stores a funding database, and the computer processing instructions cause the data processor to save in the token record by:
receiving from one communications device, via one communications channel, a token request including a reference identifier and a credential;
locating in the funding database a database record associated with the reference identifier, extracting a validation code from the located database record, and confirming that the credential matches the validation code;
generating the subledger identifier, initializing the balance value of the located subledger equal to the authorization limit, and saving the subledger identifier in the token record in association with the limited-use token; and
providing the one communications device with the limited-use token via another communications channel different from the one communications channel.

3. The token management server according to claim 2, wherein the computer processing instructions cause the data processor to:
prior to receiving the token request, receive from another communications device a funding request including the validation code and an authorization limit;
initiate a transfer into the pooling ledger of a funding amount equal to the authorization limit; and
save the reference identifier in the located database record of the funding database in association with the validation code.

4. The token management server according to claim 3, wherein the computer processing instructions cause the data processor to:
receive from the one communications device a user identifier;
confirm an identity from at least the user identifier; and
initiate the transfer of the funding amount by obtaining authorization for a funds transfer of the funding amount from a source ledger associated with the user identifier.

5. The token management server according to claim 2, wherein the computer processing instructions cause the data processor to initiate the transfer from the pooling ledger by:
obtaining authorization for a funds transfer of the transfer amount from the pooling ledger; and
reducing the balance value of the located subledger by the authorization value.

6. The token management server according to claim 2, wherein the token request includes a device identifier, and the computer processing instructions cause the data processor to provide the one communications device by:
locating in an address database a destination address associated with the device identifier; and
transmitting the limited-use token to the destination address.

7. A token processing network comprising:
a token service provider server;
a token management server;
a token database; and
a subledger database;
wherein the token service provider server is configured to:
save in the token database a limited-use token in a token record in association with a ledger identifier and a subledger identifier; and
wherein the token management server is configured to:
receive from a point-of-sale station, via a payment network, a token authorization request including the limited-use token and an authorization value;
locate in the token database the token record including the limited-use token, extract the subledger identifier from the located token record, locate in the subledger database a subledger associated with the subledger identifier, and confirm that a balance value associated with the located subledger is at least equal to the authorization value; and
extract the ledger identifier from the located token record, and initiate a transfer from a pooling ledger associated with the ledger identifier of a transfer amount equal to the authorization value.

8. The token processing network according to claim 7, further comprising a funding database, wherein the token management server is further configured to:
receive from one communications device, via one communications channel, a token request including a reference identifier and a credential;
locate in the funding database a database record associated with the reference identifier, extract a validation code from the located database record, and confirm that the credential matches the validation code; and
generate the subledger identifier, initialize the balance value of the located subledger equal to the authorization limit, and save the subledger identifier in the token record in association with the limited-use token,
wherein the token service provider server is further configured to provide the one communications device with the limited-use token via another communications channel different from the one communications channel.

9. The token processing network according to claim 8, wherein the token management server is further configured to:
prior to receiving the token request, receive from another communications device a funding request including the validation code and an authorization limit;
initiate a transfer into the pooling ledger of a funding amount equal to the authorization limit; and
save the reference identifier in the located database record of the funding database in association with the validation code.

10. The token processing network according to claim 9, wherein the token management server is further configured to:
receive from the one communications device a user identifier; and
initiate the transfer of the funding amount by obtaining authorization for a funds transfer of the funding amount from a source ledger associated with the user identifier.

11. The token processing network according to claim 8, wherein the token management server is configured to initiate the transfer from the pooling ledger by:
obtaining authorization for a funds transfer of the transfer amount from the pooling ledger; and
reducing the balance value of the located subledger by the authorization value.

12. The token processing network according to claim 8, further comprising an address database, wherein the token request includes a device identifier, and the token service provider server is configured to provide the one communications device by:
locating in the address database a destination address associated with the device identifier; and
transmitting the limited-use token to the destination address.

13. A method of processing limited-use tokens, the method comprising a computer server:
saving a limited-use token in a token record in association with a ledger identifier and a subledger identifier;
receiving from a point-of-sale station, via a payment network, a token authorization request including the limited-use token and an authorization value;
locating the token record including the limited-use token, extracting the subledger identifier from the located token record, locating a subledger associated with the subledger identifier, and confirming that a balance value associated with the located subledger is at least equal to the authorization value; and
extracting the ledger identifier from the located token record, and initiating a transfer from a pooling ledger associated with the ledger identifier of a transfer amount equal to the authorization value.

14. The method according to claim 13, wherein the saving in a token record comprises the computer server:
receiving from one communications device, via one communications channel, a token request including a reference identifier and a credential;
locating in a funding database a database record associated with the reference identifier, extracting a validation code from the located database record, and confirming that the credential matches the validation code;
generating the subledger identifier, initializing the balance value of the located subledger equal to the authorization limit, and saving the subledger identifier in the token record in association with the limited-use token; and
providing the one communications device with the limited-use token via another communications channel different from the one communications channel.

15. The method according to claim 14, further comprising, prior to the receiving a token request, the computer server:
receiving from another communications device a funding request including the validation code and an authorization limit;
initiating a transfer into the pooling ledger of a funding amount equal to the authorization limit; and
saving the reference identifier in the located database record of the funding database in association with the validation code.

16. The method according to claim 15, further comprising the computer server:
receiving from the one communications device a user identifier; and
confirming an identity from at least the user identifier,
wherein the initiating a transfer of a funding amount comprises the computer server obtaining authorization for a funds transfer of the funding amount from a source ledger associated with the user identifier.

17. The method according to claim 14, wherein the initiating a transfer from a pooling ledger comprises the computer server:
obtaining authorization for a funds transfer of the transfer amount from the pooling ledger; and
reducing the balance value of the located subledger by the authorization value.

18. The method according to claim 14, wherein the token request includes a device identifier, and the providing the one communications device comprises the computer server:
locating in an address database a destination address associated with the device identifier; and
transmitting the limited-use token to the destination address.

* * * * *